United States Patent
Takeda

(10) Patent No.: US 8,356,827 B2
(45) Date of Patent: Jan. 22, 2013

(54) SUPPORT STRUCTURE FOR AXLE HOUSING OF A TOWING TRACTOR

(75) Inventor: Mitsumasa Takeda, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 177 days.

(21) Appl. No.: 12/938,582

(22) Filed: Nov. 3, 2010

(65) Prior Publication Data
US 2011/0101639 A1  May 5, 2011

(30) Foreign Application Priority Data
Nov. 5, 2009  (JP) ................ P2009-254069

(51) Int. Cl.
*B60G 11/113* (2006.01)
(52) U.S. Cl. ............... 280/124.175; 280/124.17
(58) Field of Classification Search ............ 280/124.17, 280/124.174, 124.175
See application file for complete search history.

(56) References Cited

U.S. PATENT DOCUMENTS

| | | | |
|---|---|---|---|
| 2,157,499 A | | 4/1936 | Rossmann |
| 3,378,250 A * | | 4/1968 | Marti ............... 267/52 |
| 3,494,609 A * | | 2/1970 | Harbers, Jr. ............ 267/52 |
| 5,921,570 A * | | 7/1999 | Lie ............... 280/124.175 |
| 5,950,971 A * | | 9/1999 | Koumbis et al. ............ 248/200 |
| 6,032,967 A * | | 3/2000 | Ogoniek ............... 280/124.175 |
| 6,257,606 B1 * | | 7/2001 | Hynes et al. ........... 280/124.175 |
| 6,406,008 B1 * | | 6/2002 | Dudding et al. ............... 267/52 |
| 8,196,943 B2 * | | 6/2012 | Batdorff ............... 280/124.175 |
| 2006/0244236 A1 * | | 11/2006 | Cortez et al. ............ 280/124.175 |
| 2007/0108717 A1 * | | 5/2007 | Stoesz et al. ........... 280/124.175 |
| 2007/0187919 A1 * | | 8/2007 | Furman ............... 280/124.175 |

FOREIGN PATENT DOCUMENTS
JP  11-291731 A  10/1999

OTHER PUBLICATIONS
Examination Report of Australian Patent Application 2010236036, dated Jun. 28, 2011.

* cited by examiner

*Primary Examiner* — Drew Brown
(74) *Attorney, Agent, or Firm* — Sughrue Mion, PLLC

(57) ABSTRACT

A support structure for an axle housing of a towing tractor includes a leaf spring forming a part of a suspension, an axle housing which has a contact surface and is supported at opposite ends of the axle housing by the suspension and a spring seat which is separately provided from the leaf spring and the axle housing and disposed between the leaf spring and the axle housing, and the spring seat has a support surface. The axle housing is supported by the spring seat in plane surface contact between the contact surface and the support surface.

8 Claims, 3 Drawing Sheets

SUPPORT STRUCTURE FOR AXLE HOUSING OF A TOWING TRACTOR

BACKGROUND OF THE INVENTION

The present invention relates to a support structure for an axle housing of a towing tractor which is supported integrally at the opposite ends thereof by a suspension having leaf springs.

Japanese Patent Application Publication H11-291731 discloses a support structure for an axle housing of a towing tractor. According to the publication, the axle housing connecting the opposite wheels of the towing tractor is bound to a leaf spring by a spring seat, two U-bolts, a lower spring seat and a U-bolt restraining member and also supported by the leaf spring.

The spring seat includes a seat contacting with the leaf spring, a pair of side walls facing each other and extending from the opposite sides of the seat and a pair of gutter-shaped flanges extending outward from the respective side walls in opposite directions. The axle housing is supported on the leaf spring through the spring seat by engaging curved portion of the U-bolts with the axle housing, inserting leg portions of the U-bolts through the holes of the lower spring seat and screwing nuts on the threaded ends of the leg portions of the U-bolts.

Specifically, the axle housing is connected to the spring seat by welding the outer peripheral surface of the axle housing to the inner surfaces of the flanges of the spring seat for preventing the axle housing from rotating on its axis. The welded portion that is subjected to various kinds of forces such as torque, reaction force, loads from the road and the like requires high weld strength. Since the welding should be performed carefully, the working efficiency in forming the support structure of the axle housing is deteriorated. Furthermore, when the axle housing or the spring seat is to be replaced with a new part, they have to be replaced as a unit because they are welded together and, therefore, the replacement work will become costly.

The present invention is directed to providing a support structure for an axle housing of a towing tractor in which the axle housing can be supported on a leaf spring without welding a spring seat to the axle housing so that the spring seat or the axle housing may be replaced independently.

SUMMARY OF THE INVENTION

A support structure for an axle housing of a towing tractor includes a leaf spring forming a part of a suspension, an axle housing which has a contact surface and is supported at opposite ends of the axle housing by the suspension and a spring seat which is separately provided from the leaf spring and the axle housing and disposed between the leaf spring and the axle housing, and the spring seat has a support surface. The axle housing is supported by the spring seat in plane surface contact between the contact surface and the support surface.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENT

The following will describe the embodiment of the support structure for the axle housing as embodied in a battery-powered towing tractor with reference to FIGS. 1 through 6. In the following description, the references to directions or locations such as front, rear, right, left, up, down will be used as viewed from an operator looking forward in a cab seat of the towing tractor.

Figure 1:
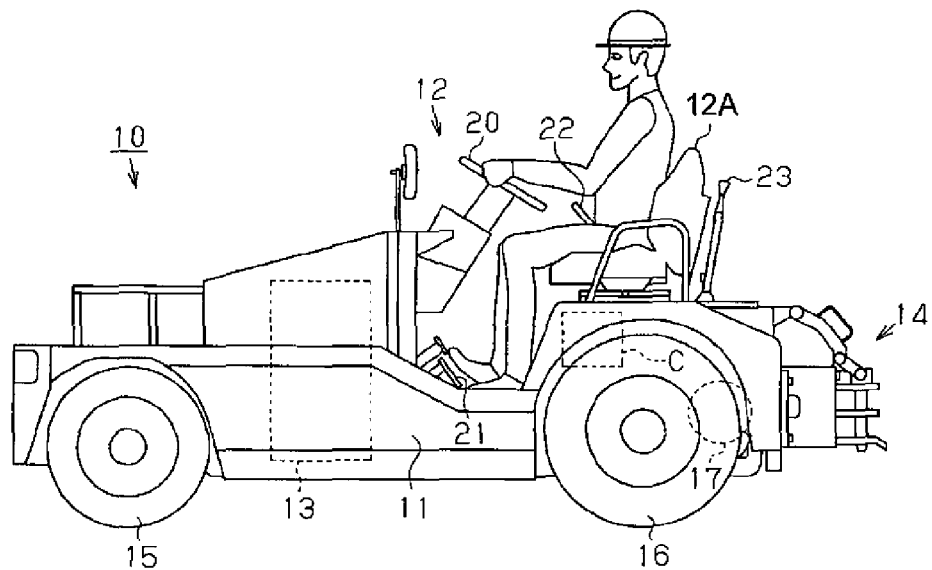
FIG. 1 is a side view of a towing tractor according to an embodiment of the present invention.

Referring to FIG. 1, the towing tractor is generally designated by numeral 10, having a tractor body 11 and a cab seat 12 provided close to the rear of the tractor body 11 and having a seat 12A. A drawbar device 14 is provided in the rear of the tractor body 11 and also rearward of the cab seat 12. A battery 13 is accommodated in a battery compartment (not shown) that is provided in the front of the tractor body 11. The towing tractor 10 has a pair of front wheels 15 and a pair of rear wheels 16.

Figure 2:
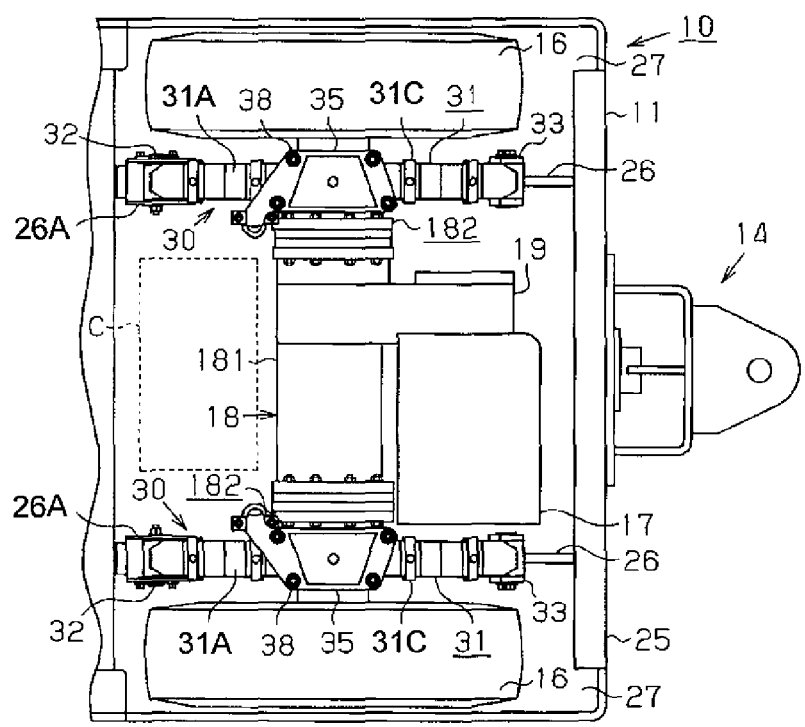
FIG. 2 is a bottom view of rear portion of the towing tractor of FIG. 1.

In FIG. 2 showing the rear bottom view of the towing tractor 10, a driving motor 17 as a drive for the towing tractor 10 is provided in the rear of the tractor body 11. A rear axle housing 18 as an axle housing having therein an axle shaft (not shown) and supporting the weight of rear part of the tractor body 11 extends in the widthwise direction of the tractor vehicle 11 in the rear of the tractor body 11 and also forward of the driving motor 17. The rear axle housing 18 is formed by a center housing 181 provided in the center of the tractor vehicle 11 and extending in the lateral direction thereof and side housings 182 fixed to the opposite ends of the center housing 181, respectively.

A transmission 19 is connected to the rear axle housing 18 (center housing 181) and the driving motor 17 for transmitting of the driving force of the driving motor 17 to the axle shaft. The driving motor 17 is provided in the rear of the tractor body 11 and a controller C is provided forward of the rear axle housing 18. The towing tractor 10 is powered by the battery 13 and the driving motor 17 is controlled by the controller C. The driving force of the driving motor 17 is transmitted to the rear wheels 16 through the axle shaft.

As shown in FIG. 1, a steering wheel 20 is provided forward of the seat 12A and an accelerator pedal 21 is provided forward and downward of the seat 12A. A parking brake lever 22 is provided on one lateral side of the seat 12A and a drawbar lever 23 is provided rearward of the parking brake lever 22 for operating the drawbar device 14.

Figure 3:
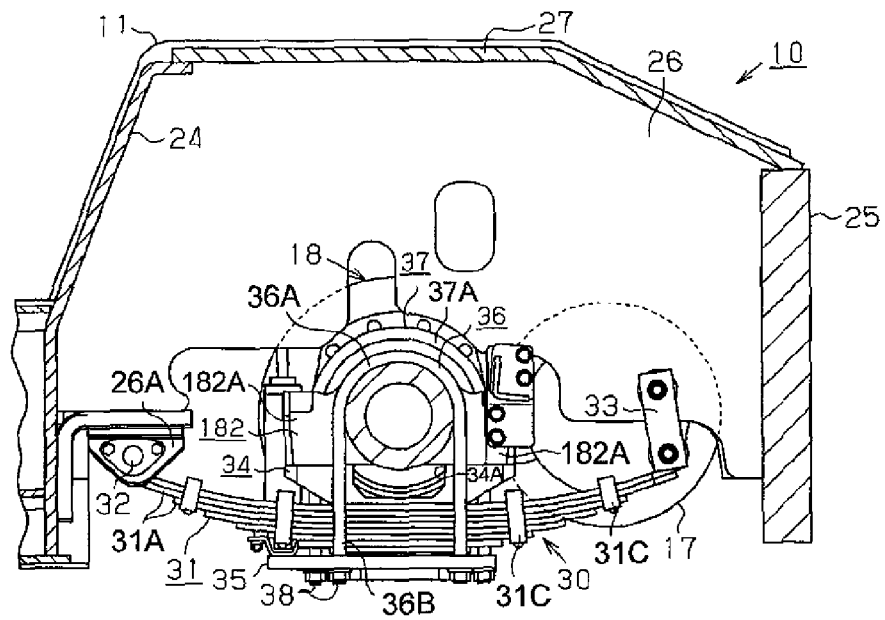
FIG. 3 is a fragmentary cross sectional view showing a suspension and its associated parts of the towing tractor of FIG. 1.

Referring to FIG. 3 showing the fragmentary cross sectional view of the rear of the tractor body 11, the frame of the rear of the tractor body 11 includes a member plate 24 and a rear cross member 25 both extending in the lateral direction of the tractor body 11. A pair of rear side members 26 are installed in the frame between the member plate 24 and the rear cross member 25, extending in the longitudinal direction of the tractor body 11. The pair of rear side members 26 are spaced apart at a predetermined distance in the lateral direction of the tractor body 11. As shown in FIG. 2, the driving motor 17, the rear axle housing 18, the transmission 19 and the controller C are housed in a space defined by the member plate 24, the rear cross member 25 and the pair of rear side members 26. As shown in FIG. 3, a rear side cover 27 is installed on the respective rear side members 26, spanning the member plate 24 and the rear cross member 25.

Figure 4:
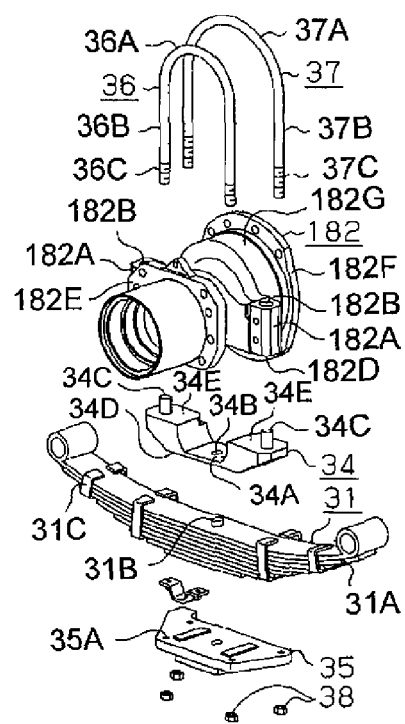
FIG. 4 is an exploded perspective view showing a support structure for an axle housing of the towing tractor of FIG. 1.

A pair of rear suspensions 30 as a suspension are provided in the rear side members 26, respectively. The rear axle housing 18 is supported at the opposite ends thereof by the pair of rear suspensions 30 and the driving motor 17 is also supported by the rear suspensions 30. As shown in FIG. 4, each rear suspension 30 includes a leaf spring 31 having a plurality of leaves 31A made of spring steel and stacked on top of each other in layers. The leaves 31A are fixed together at the center in the longitudinal direction thereof by a bolt (not shown) and a nut 31B. The nut 31B which projects upward from the center of the upper surface of the uppermost leaf 31A functions as a positioner.

Thee leaves 31A of the leaf spring 31 are bound by clips 31C at a plurality of positions along the longitudinal direction of the leaf spring 31. As shown in FIG. 3, front end (one end) of the leaf spring 31 is fixed by a pin 32 to a spring bracket 26A which is fixed to front lower end of the rear side member 26. Rear end (the other end) of the leaf spring 31 is fixed to rear lower end of the rear side member 26 through a shackle 33. The rear axle housing 18 is supported by the leaf springs 31 with the opposite ends thereof bound to the respective leaf springs 31. The following will describe the support structure of the rear axle housing 18.

Figure 6:
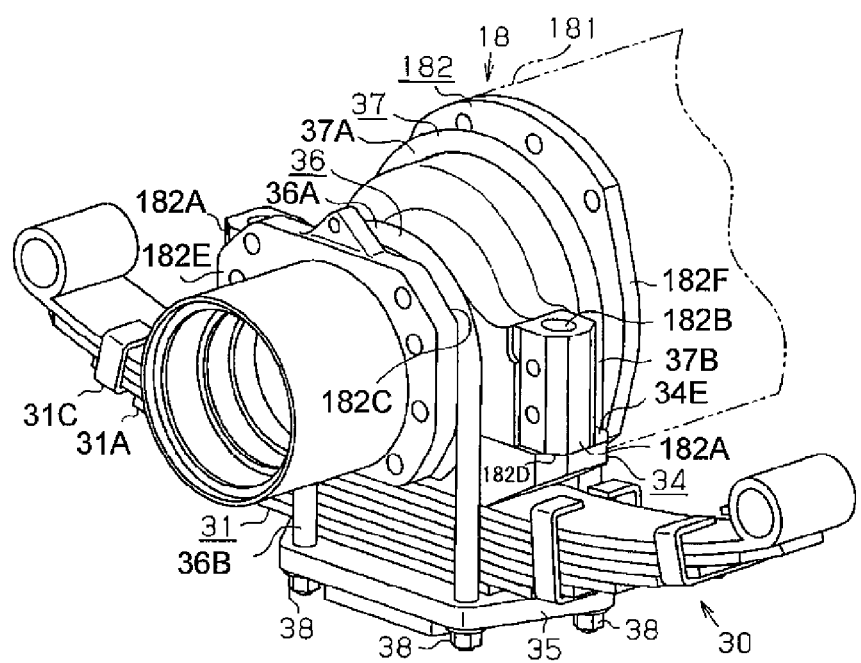
FIG. 6 is a fragmentary perspective view showing the support structure for the axle housing of FIG. 4.

As shown in FIG. 6, the rear axle housing 18 is supported at the side housing 182 thereof on the upper surface of the leaf spring 31 through a spring seat 34. The leaf spring 31, the spring seat 34 and the side housing 182 are fixed to a bracket 35 located under the leaf spring 31 by by first and second U-bolts 36, 37 and their nuts 38 (FIG. 4).

As shown in FIG. 4, the center area of the upper surface of the leaf spring 31 in the longitudinal and lateral directions thereof is formed in a plane shape and the nut 31B is protruding upward therefrom as a positioner. The spring seat 34 has a recess 34A in the center thereof in the longitudinal direction thereby to be formed into a U-shape. The width of the spring seat 34 as measured in the lateral direction is substantially the same as or slightly smaller than that of the leaf spring 31. The lower surface 34D of the spring seat 34 is formed in a plane shape and in a rectangular shape. The spring seat 34 has formed therethrough a through-hole 34B at the center thereof in the longitudinal and lateral directions, extending between the lower surface 34D and the upper surface of the recess 34A. The nut 31B (positioner) is inserted through the through-hole 34B.

The spring seat is tapered toward the bottom. That is, the spring seat 34 is formed with two surfaces extending obliquely outwardly from opposite ends of the lower surface 34D, as shown in FIGS. 3 and 4. The upper surfaces of the spring seat 34 across the recess 34A form a pair of support surfaces 34E for supporting the side housing 182. Each support surface 34E is formed in a plane shape and has a positioning pin 34C protruding upward therefrom.

Figure 5:
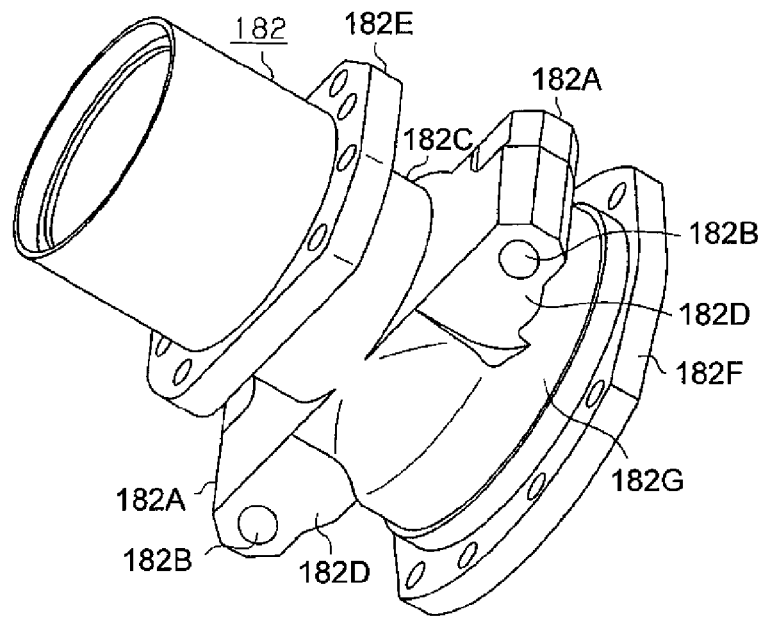
FIG. 5 is a perspective view of a side housing of the axle housing of FIG. 4.

As shown in FIG. 5, the side housing 182 of the rear axle housing 18 is substantially cylindrically-shaped and has a pair of a pair of projections 182A extending outward in opposite directions from outer peripheral surface of the side housing 182. Each projection 182A has formed therethrough a hole 182B in which the pin 34C of the spring seat 34 is inserted. The lower surface of the projection 182A forms a plane contact surface 182D contacting with the support surface 34E of the spring seat 34. The contact surface 182D is formed in a plane shape by milling the lower surface of the projection 182A.

The side housing 182 has formed on the outer periphery thereof a first flange 182E extending outward from the entire outer surface of the side housing 182 at a position outward of the projections 182A in the axial direction of the side housing 182 (on the side where the rear wheel 16 is mounted). A first groove 182C is formed between the first flange 182E and the projection 182A of the side housing 182. A brake device (not shown) is fixed to the first flange 182E. As shown in FIG. 6, the first U-bolt 36 is engaged at the curved portion 36A thereof with the first groove 182C and the movement of the side housing 182 in the axial direction of the side housing 182 is prevented by the contact between the first U-bolt 36 and each of the projection 182A and the first flange 182E.

As shown in FIG. 5, the side housing 182 has formed on the outer periphery thereof a second flange 182F extending outward from the entire outer surface of the side housing 182 at a position inward of the projections 182A in the axial direction of the side housing 182 (on the side adjacent to the center housing 181). The center housing 181 is joined to the second flange 182F. A second groove 182G is formed on the outer surface of the side housing 182 between the second flange 182F and the projections 182A. The curved portion 37A of the second U-bolt 37 is engaged with the second groove 182G and the movement of the side housing 182 in the axial direction of the side housing 182 is prevented by the contact between the second groove 182G and the second U-bolt 37.

As shown in FIG. 4, the first and the second U-bolts 36, 37 have a pair of leg portions 36B, 37B extending from the aforementioned curved portions 36A, 37A and having at the ends thereof screw portions 36C, 37C, respectively. A plate-like bracket 35 has formed therethrough four bolt-holes 35A for receiving the leg portions 36B, 37B, respectively.

As shown in FIG. 6, the rear axle housing 18 is integrally supported by the leaf spring 31 in such a way that the leaf spring 31 is supported on the bracket 35 and the spring seat 34 is supported on the leaf spring 31. The rear axle housing 18 (side housing 182) is supported at the side housing 182 thereof on the spring seat 34. The first U-bolt 36 engaged with the first groove 182C passes through the bolt-holes 35A of the bracket 35 and the screw portions 36C at the ends of the leg portions 36B of the first U-bolt 36 are fastened by the nuts 38, respectively.

Similarly, the second U-bolt 37 engaged with the second groove 182G passes through the bolt-holes 35A of the bracket 35 and the screw portions 37C at the end portions of the leg portions 37B of the second U-bolt 37 are fastened by the nuts 38, respectively. Thus, the rear axle housing 18, the spring seat 34 and the leaf spring 31 are integrally connected by the bracket 35, the first and the second U-bolts 36, 37 and the nuts 38, so that the rear axle housing 18 is supported by the leaf spring 31.

In this state, the nut 31B (positioning pin) of the leaf spring 31 is fitted in the through-hole 34B of the spring seat 34. The spring seat 34 is supported at the entire plane lower surface 34D thereof on the plane upper surface of the leaf spring 31. In other words, the leaf spring 31 and the spring seat 34 are in plane surface contact with each other at the upper surface of the leaf spring 31 and the lower surface 34D of the spring seat 34. Furthermore, the entire contact surfaces 182D of the projections 182A are supported on the plane support surface 34E of the spring seat 34. In other words, the spring seat 34 and the rear axle housing 18 are in plane surface contact with each other at the support surfaces 34E of the spring seat 34 and the contact surfaces 182D of the rear axle housing 18. The pins 34C are fitted in the holes 182B of the side housing 182.

The embodiment of the present invention offers the following advantageous effects.

(1) In the support structure of the rear axle housing 18, the rear axle housing 18 is supported by the spring seat 34 in plane surface contact between the contact surface 182D of the rear axle housing 18 and the support surface 34E of the spring seat 34. Such surface contact between the contact surface 182D of the rear axle housing 18 and the support surface 34E of the spring seat 34 prevents the rear axle housing 18 from being rotated on its axis on the spring seat 34 due to various kinds of torque, reaction force and various kinds of load exerted from the ground acting on the rear axle housing 18. Thus, the rotation of the rear axle housing 18 can be prevented by merely supporting the rear axle housing 18 on the spring seat 34 without jointing (welding) them together. This structure does not require to increase the joint strength between the rear axle housing 18 and the spring seat 34, thus facilitating to make the support structure of the rear axle housing 18.

(2) In the support structure of the rear axle housing 18 according to the present invention, the rear axle housing 18 is supported by the spring seat 34 in plane surface contact between the contact surface 182D of the rear axle housing 18 and the support surface 34E of the spring seat 34. In other words, the rear axle housing 18 and the spring seat 34 which are separate members are assembled together without welding. Therefore, when the spring seat 34 or the rear axle housing 18 needs to be replaced, either the spring seat 34 or the rear axle housing 18 can be replaced alone with a new part. In the support structure according to the Japanese Patent Application Publication H11-291731 wherein the axle housing and the spring seat are welded together, either of them cannot be replaced alone, but they have to be replaced as a unit. However, the support structure according to the present invention permits replacing the spring seat 34 or the rear axle housing 18 alone.

(3) In the embodiment of the present invention, the rear axle housing 18 is supported by the leaf spring 31 through the spring seat 34 that is a separate member. If any member corresponding to the spring seat 34 and having the same thickness as the spring seat 34 is integrally formed with the rear axle housing 18, it is difficult to manufacture the rear axle housing 18 because the rear axle housing 18 and the leaf spring 31 must have one-to-one contact relation. However, providing the spring seat 34 separately from the rear axle housing 18 as in the support structure according to the present invention, the contact relation between the rear axle housing 18 and the leaf spring 31 can be adjusted easily by forming the spring seat 34 as a separate member and changing the shape of the spring seat 34.

(4) A brake device is provided in the side housing 182 of the rear axle housing 18. The rear axle housing 18 is supported by the leaf spring 31 so that top and bottom of the brake device is oriented in a predetermined direction. The projections 182A extend outward from the side housings 182 located at the opposite ends of the rear axle housing 18 and have the contact surfaces 182D which are formed in a plane shape. The support surface 34E of the spring seat 34 supporting the rear axle housing 18 is also formed in a plane shape. In the support structure according to the present invention, only by supporting the contact surface 182D of the rear axle housing 18 on the support surface 34E of the spring seat 34, the rear axle housing 18 can be supported by the leaf spring 31 so that top and bottom of the brake device is oriented to a predetermined direction.

(5) The pins 34C are formed to protrude from the support surfaces 34E of the spring seat 34 and their corresponding holes 182B are formed in the respective contact surfaces 182D of the rear axle housing 18. When the contact surfaces 182D of the rear axle housing 18 are supported on the support surfaces 34E of the spring seat 34, respectively, movement of the rear axle housing 18 in longitudinal and lateral directions can be prevented by the engagement of the pin 34C in the hole 182B.

(6) The nut 31B (positioning pin) protrudes from the upper surface of the leaf spring 31 and its corresponding through-hole 34B is formed in the spring seat 34. By inserting the nut 31B into the through-hole 34B, the spring seat 34 can be placed at a predetermined position on the leaf spring 31. Furthermore, the pins 34C of the spring seat 34 are also inserted into the holes 182B formed in the contact surfaces 182D of the rear axle housing 18, respectively and, therefore, the leaf spring 31, the spring seat 34 and the side housing 182 can be integrally positioned. Thus, the first and the second U-bolts 36, 37 may be fixed to the bracket 35 easily because the leaf spring 31, the spring seat 34 and the rear axle housing 18 are assembled securely without being moved during the fixing.

(7) The plane lower surface 34D and the plane support surface 34E of the spring seat 34 contacts with the leaf spring 31 and the rear axle housing 18, respectively. A part of the rear axle housing 18 is received in the recess 34A of the spring seat 34 but the spring seat 34 does not support the rear axle housing 18 directly along inner surface of the recess 34A, so that the recess 34A need not be formed precisely. Since the lower surface 34D and the support surface 34E of the spring seat 34 are only formed in a plane shape and the recess 34A needs not to be formed precisely, the spring seat 34 can be manufactured easily.

(8) The rear axle housing 18 is supported by the leaf spring 31 through the spring seat 34 that is a separate member. If any member corresponding to the spring seat 34 and having the same thickness as the spring seat 34 is integrally formed with the rear axle housing 18, the size of the rear axle housing 18 will increase. Providing the spring seat 34 as a separate member, however, the rear axle housing 18 can be downsized and assembled to the tractor body 11 easily.

(9) The spring seat 34 is tapered toward the bottom, having two surfaces extending obliquely outwardly from the opposite ends of the lower surface 34D. Therefore, when the spring seat 34 is supported on the leaf spring 31, interference between the clip 31C of the leaf spring 31 and the spring seat 34 can be prevented. Because of such tapered shape of the spring seat 34, the area of contact between the spring seat 34 and the leaf spring 31 can be reduced as compared with a case where the spring seat 34 is not tapered. Furthermore, the spring seat 34 contacts only at the lower surface 34D thereof with center region of the upper surface of the leaf spring 31 and, therefore, a force from the spring seat 34 can be concentrated on a region of the leaf spring 31 (center region of upper surface) where a large spring force is applied to.

(10) The rear axle housing 18 has two contact surfaces 182D which are placed in contact with two support surfaces 34E of the spring seat 34. Such surface contact between the rear axle housing 18 and the spring seat 34 at two different positions prevents the rear axle housing 18 from being rotated.

(11) The leaf spring 31 is formed of a plurality of leaves 31A tied together by a bolt and its nut 31B that is used also as a positioner for positioning the spring seat 34. As compared with a case where parts such as bolt and nut 31B for fixing the leaves 31A and a part for positioning the spring seat 34 on the leaf spring 31 are provided separately, the number of parts for the support structure of the rear axle housing 18 can be reduced.

The above embodiments may be modified as follows.

The support structure according to the embodiment may dispense with the pins 34C of the spring seat 34 and their corresponding holes 182B of the side housing 182.

The support structure according to the embodiment has a pair of support surfaces 34E and a pair of contact surfaces 182D. However, as long as the rotation of the rear axle housing 18 can be prevented, the support structure may have only one support surface 34E and one contact surface 182D.

A plurality of leaves 31A are are fixed together by a bolt and a nut 31B in the support structure according to the embodiment. By providing the bolt in such a way that its head protrudes from the upper surface of the leaf spring 31, the bolt head may be used as a positioner for positioning. Alternatively, the plurality of leaves 31A may be fixed together by a rivet and the rivet may be used as a positioner for positioning instead of the nut 31B by protruding the rivet from the upper surface of the leaf spring 31.

The contact surfaces 182D of the projections 182A of the side housing 182 may be formed in tiers and the corresponding support surface 34E of the spring seat 34 may be also formed in tiers so as to contact with respective tiers of the contact surface 182D.

The support structure for axle housing according to the present invention may be applied to the front axle housing in which a leaf spring front suspension is provided for the front wheels 15 of the towing tractor 10 and the front axle housing is supported by the leaf spring front suspension.

The towing tractor 10 may have an engine as a driving source or it may be a hybrid vehicle having an engine and the driving motor 17.

What is claimed is:

1. A support structure for an axle housing of a towing tractor comprising:
   a leaf spring forming a part of a suspension;
   an axle housing which has a contact surface and is supported at opposite ends of the axle housing by the suspension; and
   a spring seat which is separately provided from the leaf spring and the axle housing and disposed between the leaf spring and the axle housing, and the spring seat has a support surface, wherein
   the axle housing is supported by the spring seat in plane surface contact between the contact surface and the support surface, and wherein
   the axle housing has a pair of projections which are formed so as to extend outward in opposite directions from outer peripheral surface of the axle housing and has a pair of contact surfaces formed on lower surfaces of the pair of the projections, wherein the spring seat has a pair of support surfaces which are formed on a pair of upper surfaces of the spring seat.

2. The support structure for an axle housing of a towing tractor according to claim 1, wherein
   the spring seat has a recess in center of the spring seat between the pair of the support surfaces thereby to be formed into U-shape.

3. The support structure for an axle housing of a towing tractor according to claim 1, wherein
   the leaf spring has a positioner, wherein the spring seat has a through-hole, wherein the spring seat is positioned on the leaf spring by inserting the positioner into the through-hole when the spring seat is supported on the leaf spring.

4. The support structure for an axle housing of a towing tractor according to claim 3, wherein
   the leaf spring is formed of a plurality of leaves tied together by a nut (31B) and a bolt or a rivet, wherein the positioner is either the nut or the bolt, or the rivet .

5. The support structure for an axle housing of a towing tractor according to claim 1, wherein
   the spring seat is supported by the leaf spring in plane surface contact between lower surface of the spring seat and upper surface of the leaf spring.

6. The support structure for an axle housing of a towing tractor according to claim 5, wherein
   the spring seat has two surfaces extending obliquely outwardly from opposite ends of the lower surface of the spring seat to opposite side ends of the spring seat.

7. The support structure for an axle housing of a towing tractor according to claim 1, wherein
   the support structure further comprising:
   a U-bolt (36, 37) having a curved portion (36A, 37A), the curved portion being engaged with the axle housing;
   a bracket (35) having a bolt-hole (35A) for receiving the U-bolt; and
   a nut (38), wherein the axle housing, the spring seat and the leaf spring are integrally fixed by the U-bolt, the bracket and the nut in such a way that the U-bolt passes through the bolt-hole of the bracket and the U-bolt is fastened by the nut.

8. A support structure for an axle housing of a towing tractor comprising:
   a leaf spring forming a part of a suspension;
   an axle housing which has a contact surface and is supported at opposite ends of the axle housing by the suspension; and
   a spring seat which is separately provided from the leaf spring and the axle housing and disposed between the leaf spring and the axle housing, and the spring seat has a support surface, wherein
   the axle housing is supported by the spring seat in plane surface contact between the contact surface and the support surface, wherein the support surface has a pin (34C) protruding upward from the support surface for positioning, and wherein the contact surface has a hole (182B) in which the pin is inserted.

* * * * *